Figure 4:
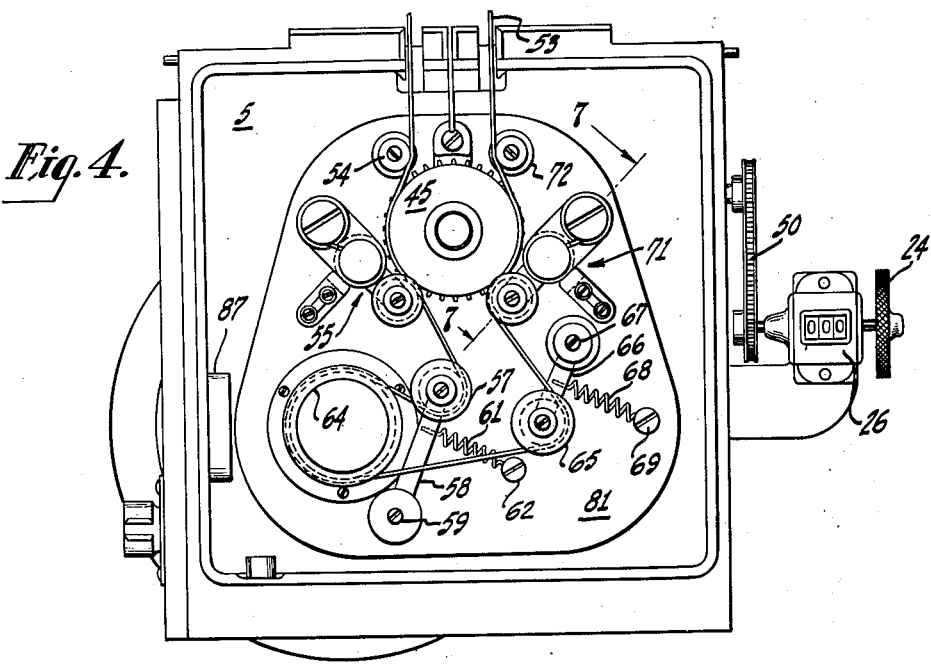

Sept. 23, 1952 M. E. COLLINS 2,611,551
PORTABLE SOUND FILM RECORDER
Filed April 4, 1947 4 Sheets-Sheet 1
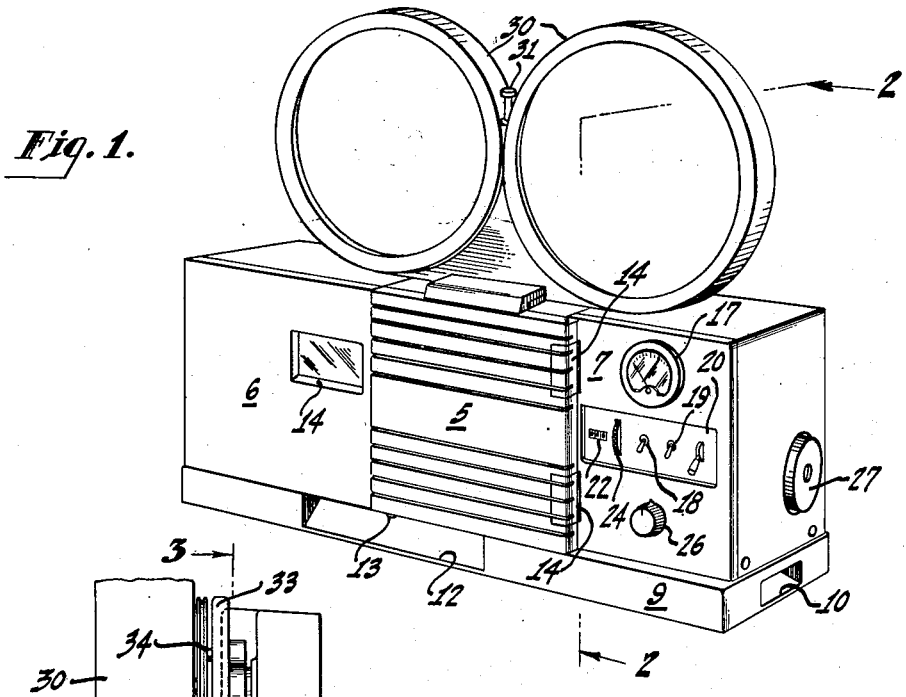
Fig. 1.
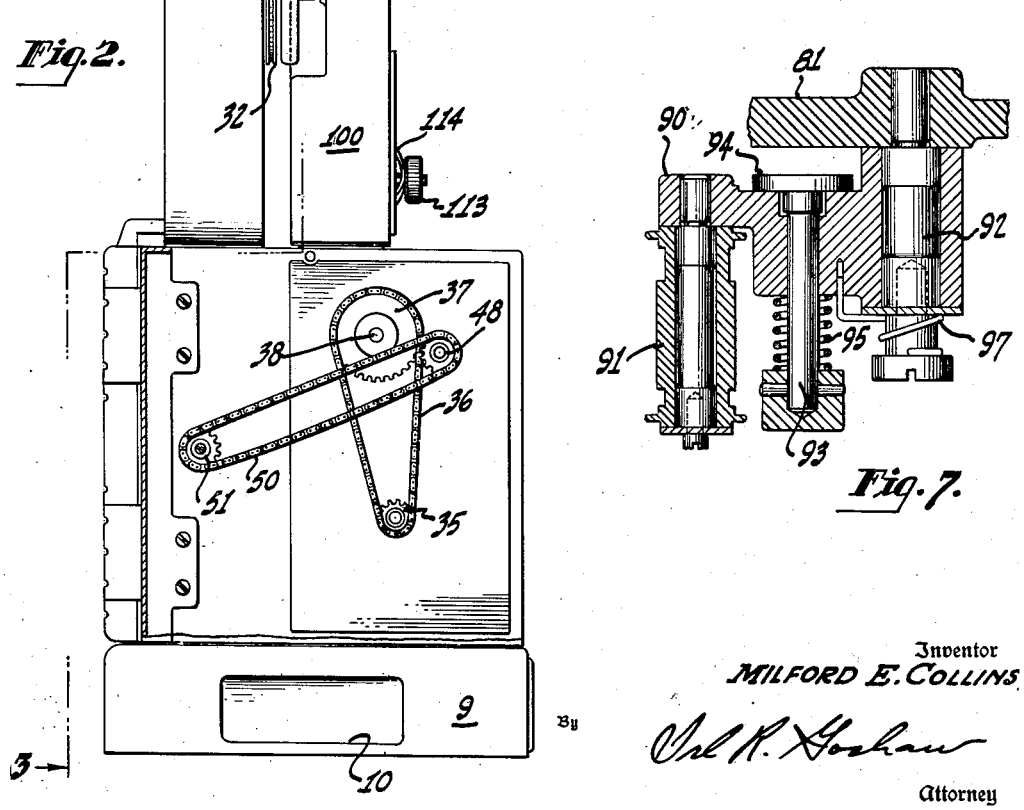
Fig. 2.
Fig. 7.
Inventor
MILFORD E. COLLINS
Attorney Sept. 23, 1952 M. E. COLLINS 2,611,551
PORTABLE SOUND FILM RECORDER
Filed April 4, 1947 4 Sheets-Sheet 2
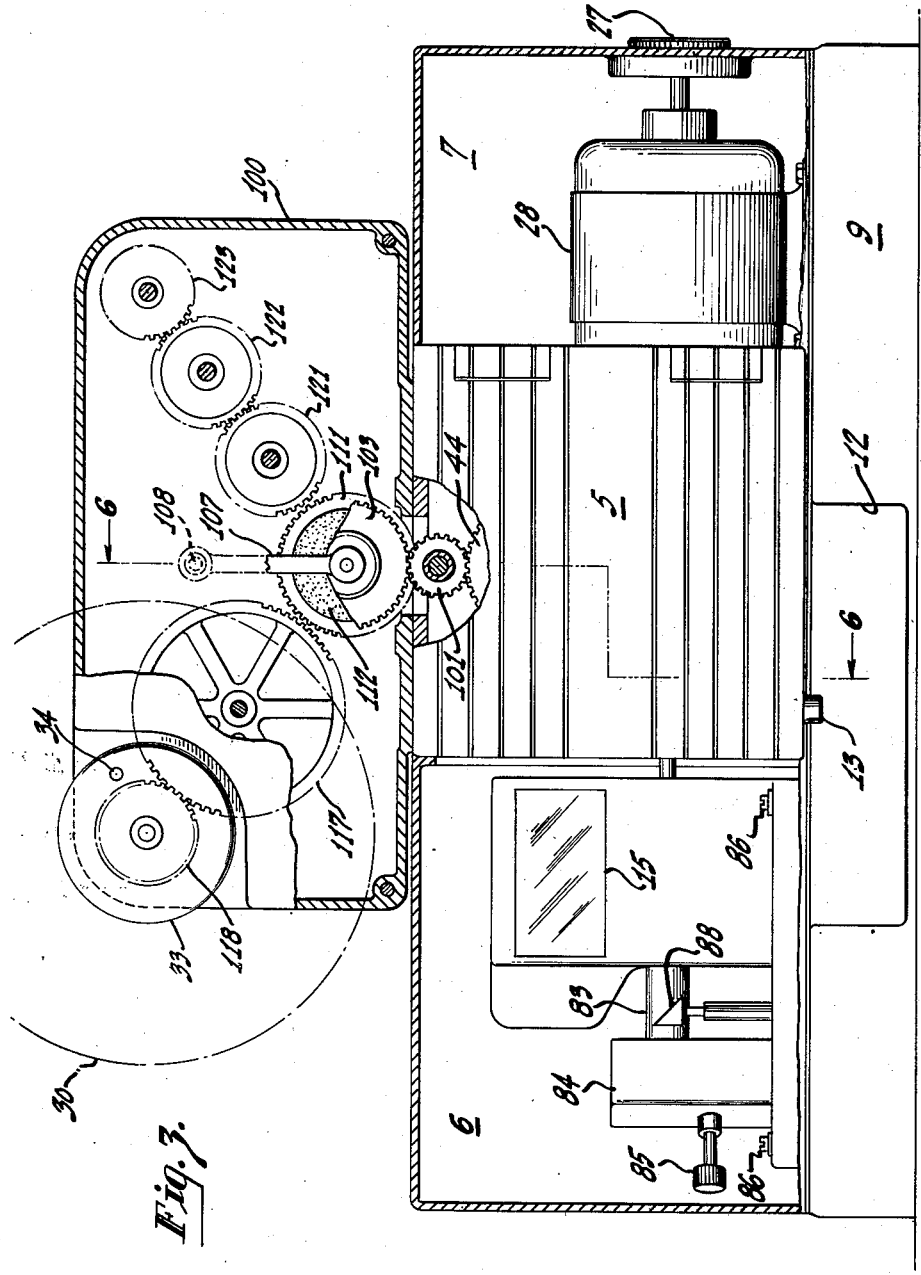
Inventor
MILFORD E. COLLINS,
By
Attorney Inventor
MILFORD E. COLLINS
By
Attorney Inventor
MILFORD E. COLLINS,
By
Attorney Patented Sept. 23, 1952

2,611,551

UNITED STATES PATENT OFFICE 2,611,551

PORTABLE SOUND FILM RECORDER

Milford Edwin Collins, Studio City, Calif., assignor to Radio Corporation of America, a corporation of Delaware Application April 4, 1947, Serial No. 739,512

1 Claim. (Cl. 242—55)

This invention relates to sound recording and particularly to apparatus for photographically recording sound on film.

The general type of sound recorder described hereinafter is well known in the art. The essential components of such a recorder include a film advancing mechanism which maintains a constant and uniform film speed past the recording light beam, an optical system for supplying, modulating and impressing the modulated light on the film, film supply and take-up reels within a magazine attachable and detachable from the recorder, and a take-up reel drive. In the past costly and complicated film drives have been employed to obtain a uniform film motion at the translating point, these drives utilizing various types of mechanical filters between the driving motor and film advancing sprockets. Mechanical filters for the recording drum over which the film passed and filters in the film loops were also used to aid in obtaining a constant film motion. In the present recorder, the number of such filters has been reduced to a minimum and the filters used are of the simplest types such as fly wheels and spring tensioned rollers. The recorder provides improved performance, dependable operation and the parts are easily accessible for servicing.

Furthermore, the recorder of the invention is light in weight, compact and simple in overall design, there being a central section containing the film advancing mechanism, an end section containing the optical portion of the recorder, and an end section containing the motor and controls for the recorder. The recorder is mounted on a base under which the electrical wiring is contained. For driving the take-up reel from within the recorder, a gear drive is provided which remains attached to the recorder at all times and which automatically connects to and drives the particular film reel according to the direction of rotation of the film advancing sprockets. The recorder is capable of advancing film in either direction with equal efficiency and is capable of operation with an optical system which will record different types of tracks such as standard variable area, class A push-pull, class B push-pull, class AB push-pull, double width and direct positive. The important features of the invention may be used for recorders of either 35 mm. or 16 mm. film with the appropriate changes in the film advancing sprockets and rollers, the take-up assembly, the film magazines and the film drive to provide the proper film speed. Other features of the invention will become obvious from the following detailed description of the recorder.

The principal object of the invention, therefore, is to facilitate the photographic recording of sound on film.

Another object of the invention is to provide an improved film drive which will produce a constant film motion with the minimum of filtering elements.

A further object of the invention is to provide an improved motor drive and motion filter for obtaining a constant film speed at a light translation point.

A still further object of the invention is to provide a portable recorder which may advance film in either one of two directions and which has an automatic gear shift for driving the required take-up reel according to the direction of film advancement.

A still further object of the invention is to provide a sound recorder with an overall construction which is simple and economical to manufacture, and which is particularly portable.

Figure 5:
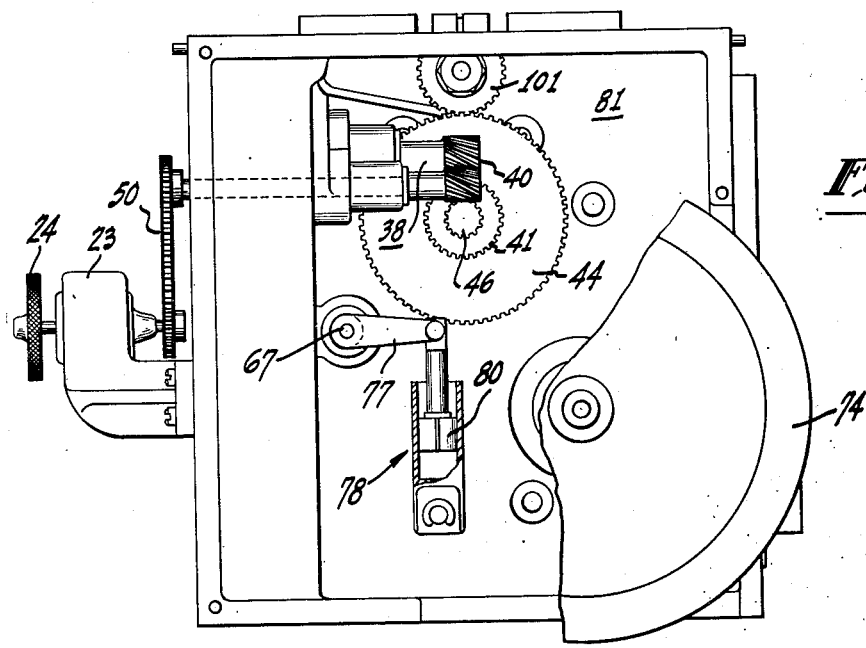
Figure 6:
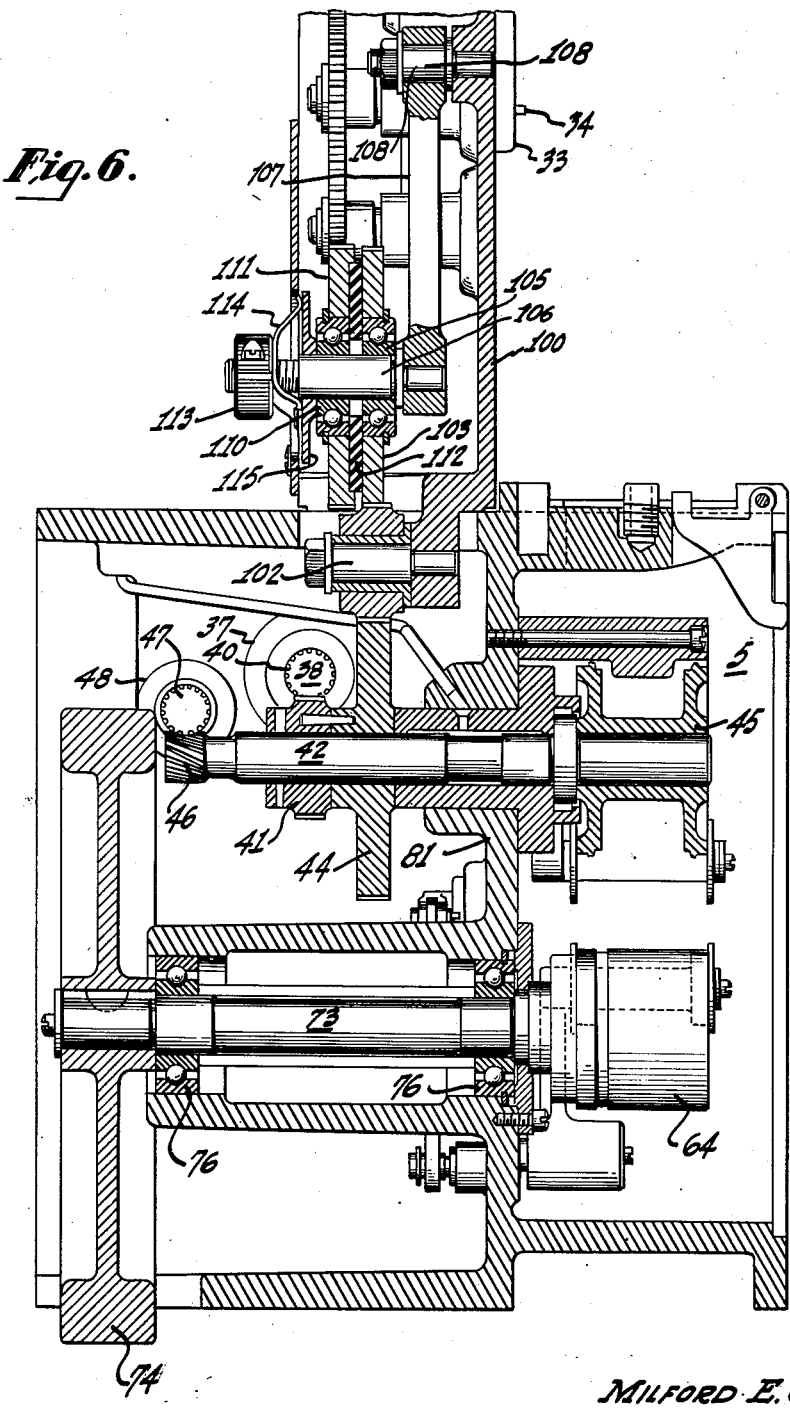

Although the novel features wich are believed to be characteristic of this invention will be pointed out with particularity in the appended claim, the manner of its organization and the mode of its operation will be better understood by referring to the following description read in conjunction with the accompanying drawings forming a part hereof, in which:

Fig. 1 is the perspective view of a sound film recorder embodying the invention, Fig. 2 is an end view of the recorder taken along the line 2—2 of Fig. 1, Fig. 3 is a front elevational view of the recorder shown in Fig. 1 taken along the line 3—3 of Fig. 2, Fig. 4 is a front elevational view of the film advancing mechanism of the recorder, Fig. 5 is the rear elevational view of the film drive, Fig. 6 is a cross-sectional view of the recorder taken along the line 6—6 of Fig. 3, and, Fig. 7 is a cross-sectional view of one of the pad rollers used on the drive sprocket of the recorder and taken along the line 7—7 of Fig. 4.

Referring now to the drawings in which the same numerals refer to identical elements, the recorder has three compartments or sections such as a central film advancing section 5, an optical section 6 and a motor and control section 7. The three compartments of the recorder are mounted on a magnesium base assembly 9 enclosing the modulation transformers and wiring, the base having recesses at the ends thereof, such as shown at 10, to provide handles for lifting the recorder. On the rear of the base 9, there is mounted the electrical connecting plugs and a reversing switch, while the corners are tapped so the recorder may be bolted in place. A front recess 12 is also provided to permit the film compartment door latch finger button 13 to be positioned under the door which is adapted to swing on hinges 14.

The optical compartment 6 is provided with a window 14 through which a monitoring screen 15 may be observed during adjustment and operation of the recorder. The motor and control compartment 7 has a front panel on which is mounted a lamp modulation current meter 17, a motor switch 18, a lamp switch 19, and a switch 20. Also in this panel is an opening 22 for observing the numerals on a counter 23 which has a resetting knurled wheel 24. There is also provided a lamp rheostat knob 26. At the end of the compartment 7 is a hand wheel 27 for turning a driving motor 28 by hand whenever desired, the motor being either a synchronous, A. C. or D. C. interlock motor resiliently mounted to the base 9. When the motor compartment cover is removed, the motor, flywheel, dash pot assembly and all gearing is readily accessible.

Mounted on top of the recorder is a film magazine 30 attached to the recorder by a bolt 31. This magazine is of the standard type having reel driving pulleys such as shown at 32 in Fig. 2, these pulleys having annular grooves in their peripheries in case the wheels are to be belt driven, or openings in the sides of the wheels into which driving pins, such as shown at 34 on the drive discs 33, may be inserted.

Referring now to the drive for the recorder, the motor 28 in section 7 has a sprocket wheel 35 mounted on a shaft and, through a chain 36, drives a sprocket 37 on a shaft 38. The shaft 38 has a worm 40 on the end thereof which is in mesh with a pinion gear 41 on a shaft 42. On the shaft 42 is mounted a take-up reel driving gear 44, a film sprocket 45 and a worm gear 46. The worm gear 46 is in mesh with a pinion gear 47 which drives a sprocket wheel 48. Through a chain 50, around a sprocket 48 and a sprocket 51, a counter 23 is driven at the proper speed to measure the film footage passing through the recorder. The chains are of the silent type while helical gears are used.

As shown in Fig. 4, in which a film 53 is threaded in the recorder, the film path is from the supply reel in the magazine 30 through an opening in the top of the recorder, which is made light tight when the magazine is placed on the recorder, past a guide roller 54, around the left hand side of the sprocket 45 and a pad roller on a unit 55, and around a tensioned roller 57 mounted on an arm 58 pivoted at 59 and maintained under tension by a spring 61 between the arm 58 and an anchor 62. The film then passes around a film-pulled recording drum 64 to a damped tensioned roller 65 mounted on an arm 66 pivoted at 67 and under tension of a spring 68 anchored at 69. The film then passes around the roller on a pad roller unit 71 to the right hand side of the sprocket 45 and then to the take-up reel over a guide roller 72. The tensioned rollers 57 and 65 are flanged for edge guiding the film and of anodized aluminum fitted with precision ball bearings while the arms 58 and 66 are light in weight.

The above described film path is particularly easy to thread as only a single sprocket is involved and two pad rollers. Uniformity of film advancement at the sound translation point, which is the point on drum 64 farthest to the left, is obtained in part by the use of a dynamically balanced fly wheel 74 mounted on the end of a shaft 73 on which the drum is mounted. The shaft 73, carrying the drum 64 and the fly wheel 74, is rotatable on ball bearings 76. This unit provides a damping action in the well known manner. To further filter out any speed variation which the sprocket 45 may introduce into the film, the tensioned rollers 57 and 65 are provided, further damping being introduced by having the movement of the roller 65 controlled by a dash pot 78 having a piston 80 connected to the pivot shaft 67. The dash pot 78 is mounted on the rear of a wall 81. Thus, the film motion is maintained constant at the translation point by the resiliently mounted idler rollers 57 and 65, the fly wheel on the shaft of the film-pulled drum 64 and the damping of the tension roller 65. This simple drive has been found to provide excellent film motion stability such as a total flutter for all frequency bands of approximately ±0.05% and negligible sprocket hole and low frequency disturbances.

The optical portion of the recorder shown in section 6 employs the usual recorder lamp under control of the rheostat knob 26 which projects light through an optical barrel 83 to a galvanometer 84 having a hand knob adjustment 85 which may be accessible without removing the optical compartment cover. Light from the lamp is projected through a slit and the lenses of an optical unit 87 in the usual manner to the film on drum 64. Monitoring of the modulating light beam is obtained by deflecting a portion of the light by reflector 88 horizontally and then upwardly to the screen 15 where an image may be viewed through the window 14. The entire optical unit is removable from its compartment by removing screws 86 from the base of the unit. This unit may be of the type disclosed and claimed in Dimmick U. S. application Serial No. 629,294, filed November 17, 1945, now Patent No. 2,468,047, or of any suitable standard type, either variable area or variable density.

The pad roller units 55 and 71 are shown in detail in Fig. 7. An arm 90 carrying the shaft on which a roller 91 is rotatable is pivoted on a shaft 92 mounted in the wall 81. The pad roller 91 is locked in a predetermined fixed position with respect to the surface of the sprocket 45 by a spring push pin 93 having a head 94 and under tension of a spring 95. A spring 97 maintains the roller 91 in threading position after the arm is released by pressure on the pin 93. This general type of pad roller is disclosed and claimed in my U. S. Patent No. 2,418,544 of April 8, 1947.

Referring now to Figs. 2, 3 and 6, fixedly attached to the top of the recorder is a housing 100 which contains two trains of gears, rotated by the main gear 44, for driving either of the reels within the magazine 30. The first gear driven is gear 101 mounted on a stub shaft 102 attached to an extension of the front plate of the casing 100. The gear 101 is adapted to mesh with the gear 44 when the casing 100 is attached to the recorder, this gear also meshing at all times with a gear 103 mounted on a bearing 105 on a shaft 106. The shaft 106 is attached in the end of an arm 107 pivoted on a shaft 108.

Also mounted on the shaft 106 is a second bearing 110 upon which a second gear 111 is rotatable. Interposed between the gears 103 and 111 is a friction washer 112, the amount of friction being determined by the position of a nut 113 bearing against a spider spring 114 which in turn bears against a pressure plate 115. Thus, the gear 111 is rotated by the friction between the surfaces of the washer 112 and the sides of the gears 103 and 111, this construction being provided to permit speed compensation to be made as the diameter of the film roll increases.

As shown in Fig. 3, on the left side of the arm 107 is a gear 117 in mesh with a gear 118 for rotating the drive wheel on disc 33. On the right side of the arm 107 a gear 121 is shown in mesh with a gear 122 which in turn is in mesh with a gear 123 to drive a wheel or disc similar to the disc 33. As shown in Fig. 3 the gear 111 is not in mesh with either gear 117 or 121, but will mesh with either of these gears depending on the direction of rotation of the gear 101. That is, should the gear be rotated in a clockwise direction the gears 103 and 111 will be thrust to the right on the pivot 108 and the gear 111 will then mesh with gear 121 and the right hand drive wheel will be rotated. Should the gear 101 be rotated in a counter-clockwise direction, then the gears 103 and 111 will be moved to the left and gear 111 will be placed in mesh with gear 117 and drive wheel 33 will be driven.

Thus, according to the direction of advancement of the film 53 through the recorder, the proper reel will be driven to take up the film, leaving the other reel free to supply the film. The purpose of providing one intermediate gear 117 between gear 111 and driving disc 33, and two intermediate gears 121 and 122 between gear 111 and the right hand drive wheel, is to permit driving the take-up reels in the proper direction. For instance, if it is desired to reverse the film motion when only a portion of the film has been unwound from one reel and wound on the other reel, it is necessary that the supply reel, when used for the take up, must rotate in the opposite direction from the direction it had when supplying the film. Thus, by using an extra gear in one gear chain both of the drive wheels 103 and 33 will always be rotated in the same direction during operation as take-up and supply reels and both will be simultaneously reversed when the shift is made in the reel acting as the take-up reel.

Although the above type of film take-up has been illustrated it is to be understood that a belt form of take-up may also be attached to the recorder, such a take-up being disclosed and claimed in my copending application Serial No. 737,381, filed March 26, 1947, now Patent No. 2,499,850. The above described gear drive, however, permits an automatic shift in the take-up drive of the reels and permits an automatic connection to be made between the drive wheels 33 and the reel wheels 32 of the magazine.

The above recorder, as described, has a minimum of parts and is of light weight so that it is easily portable while providing excellent film motion and a simplified control. It is only necessary to set the film magazine 30 on the recorder, thread the film as shown in Fig. 4, throw the light switch, adjust the light beam as it appears upon the monitoring screen 15, and then throw the motor switch to place the recorder in operation. The recorder is sturdy and only necessary adjustments have been retained and these are easy to make and readily accessible.

I claim:

A sound recorder comprising a base section, a housing divided into compartments mounted on said base section, a driving mechanism in one of said compartments for advancing film in either direction therethrough, a film magazine including a casing having a pair of reels mounted on said housing, one of said reels being adapted to supply film to said mechanism when the other of said reels is winding up film therefrom, a film reel drive unit separate from said magazine and mounted between said mechanism and said magazine for driving said reels, the said drive unit including two independent gear trains, one of said trains consisting of an even number of gears operatively connected to one of said reels to drive the same in one direction and the other of said trains consisting of an odd number of gears operatively connected to the other of said reels to drive the same in the opposite direction, and a freely translatable gear interposed between said driving mechanism and the said gear trains for connecting either of said trains with said mechanism.

MILFORD EDWIN COLLINS.

REFERENCES CITED

The following references are of record in the file of this patent:

UNITED STATES PATENTS

| Number | Name | Date |
| --- | --- | --- |
| 1,714,816 | Proctor | May 28, 1929 |
| 1,892,554 | Kellogg | Dec. 27, 1932 |
| 2,061,177 | Tasker | Nov. 17, 1936 |
| 2,108,337 | Hoffman | Feb. 15, 1938 |
| 2,215,468 | Herzig | Sept. 24, 1940 |
| 2,275,497 | Berndt | Mar. 10, 1942 |
| 2,417,651 | Kuhlik | Mar. 18, 1947 |

FOREIGN PATENTS

| Number | Country | Date |
| --- | --- | --- |
| 14,275 of 1914 | Great Britain | June 14, 1915 |